United States Patent [19]

Janner et al.

[11] 4,342,727
[45] Aug. 3, 1982

[54] METHOD FOR THE SEPARATION OF GASEOUS ISOTOPE COMPOUNDS

[75] Inventors: Karl Janner, Erlangen; Klaus Gregorius, Neunkirchen, both of Fed. Rep. of Germany

[73] Assignee: Kraftwerk Union Aktiengesellschaft, Mülheim, Fed. Rep. of Germany

[21] Appl. No.: 89,520

[22] Filed: Oct. 30, 1979

[30] Foreign Application Priority Data

Nov. 13, 1978 [DE] Fed. Rep. of Germany ....... 2849162

[51] Int. Cl.³ .............................................. B01D 59/00
[52] U.S. Cl. .................................. 423/3; 204/157.1 R
[58] Field of Search ...................... 204/157.1 R; 55/17; 423/3

[56] References Cited

U.S. PATENT DOCUMENTS 3,559,373  2/1971  Garrett ................................. 55/17 X
3,989,483  11/1976  Becker et al. .............................. 55/17
4,179,272  12/1979  Kivel ............................ 204/157.1 R

FOREIGN PATENT DOCUMENTS 2659590  7/1978  Fed. Rep. of Germany.
2834531  2/1979  Fed. Rep. of Germany.

Primary Examiner—Deborah L. Kyle
Attorney, Agent, or Firm—Herbert L. Lerner; Laurence A. Greenberg

[57] ABSTRACT

Separation of gaseous isotopes such as $UF_6$ by adiabatically expanding a gas stream containing the isotopes to cool to a temperature at which condensation or dimers are formed. Selectively exciting by electromagnetic radiation one isotope compound to inhibit condensation or to effect dissociation of dimers containing one isotope compound. Deflecting the flow of the gas stream to effect a change of isotope distribution in the gas stream. Separating by peeling the enriched portion of the gas stream from the remainder depleted portion of the gas stream.

4 Claims, 3 Drawing Figures

METHOD FOR THE SEPARATION OF GASEOUS ISOTOPE COMPOUNDS

BACKGROUND OF THE INVENTION

1. Field of the Invention

The present invention relates to a method and apparatus for the separation of gaseous isotope compounds, especially of $UF_6$, by means of selective excitation of the one isotope compound by electromagnetic radiation after adiabatic expansion of the gas.

2. Description of the Prior Art

Such methods have as their objective to raise the content of fissionable uranium isotope 235 in the starting material for the nuclear fuel manufacture from 0.7% (the natural isotope composition) to about 3% and to thereby create the condition for its use as nuclear fuel in light-water reactors. Many of the proposals made so far amount to bringing a uranium isotope or its compound as $UF_6$ by laser excitation to a more highly excited, and therefore, higher-energy state and to enable it thereby to enter preferentially into a chemical reaction with a reaction partner and to separate the reaction products stemming therefrom from the original gas mixture by, for instance, physical means. It has been found to be particularly advantageous to cool the gaseous isotope mixture to be fed-in by adiabatic expansion to a low temperature, for instance, to 30°–50° K., since in this manner a clear separation of the spectra by the isotopy shift occurs, especially in the Q-branches of the $UF_6$. This makes possible selective engagement of only the one isotope compound by means of a laser beam, the frequency of which is adjusted accordingly. For a further explanation of such an isotope separation method, reference is made to German published non-prosecuted patent application No. 24 47 762, corresponding U.S. patent application, Ser. No. 614,213 now abandoned.

In addition to these chemical reactions made possible by laser excitation, it is also possible to choose the expansion conditions so that condensation takes place in the gas jet, and to prevent the 235 $UF_6$ molecules from condensing or from attaching themselves to condensing or already condensed particles by isotope-specific laser excitation. The large mass difference caused thereby between the particles produced in the original gas jet can then be utilized for the separation thereof, as is proposed, for instance, in German application No. 26 59 590, corresponding U.S. patent application Ser. No. 862,504 now abandoned.

SUMMARY OF THE INVENTION

An object of the present invention is to provide a method and apparatus in which the isotope-specific excitation can be achieved by means of a laser radiation of relatively low energy, and with which it is possible to create isotope-specifically different mass conditions in the gas jet leaving the expansion nozzle as well as to separate these particles of different mass from each other by means of inertial forces generated in them.

With the foregoing and other objects in view, there is provided in accordance with the invention a method for the separation of gaseous isotope compounds which comprises adiabatically expanding a gas stream of the gaseous isotope compounds to cool the gas stream to a temperature in a range at which condensation of the gaseous isotopes occurs, selectively exciting by electromagnetic radiation one isotope compound in the gas stream to inhibit condensation of said one isotope compound, deflecting the flow of the gas stream containing said non-condensed isotope compound and therefore of lighter mass as compared to said condensed isotope compounds to effect a change of the isotope distribution in the gas stream caused by centrifugal forces resulting from said deflection with the non-condensed isotope compounds tending to separate from the condensed isotope compounds in the gas stream to produce a gas stream portion enriched with said one isotope compound and separating by peeling the enriched portion of the gas stream from the remainder depleted portion of the gas stream.

In accordance with the invention there is provided a method for the separation of gaseous isotope compounds of $UF_6$ in which one isotope is U 235 and another isotope is U 238 which comprises adiabatically expanding a gas stream of the gaseous isotope compounds to cool the gas stream to a temperature in a range at which dimers are formed between uranium isotope molecules, selectively exciting by electromagnetic radiation one isotope compound in the gas stream to effect selective dissociation of dimers containing said one isotope compound, deflecting the flow of said gas stream containing said dissociated isotope compound and therefore lighter mass as compared to said non-dissociated dimers to effect a change of the isotope distribution in the gas stream caused by centrifugal forces resulting from said deflection with the dissociated isotope compounds tending to separate from the dimers in the gas stream to produce a gas stream portion enriched with said one isotope compound, and separating by peeling the enriched portion of the gas stream from the remainder depleted portion of the gas stream.

There is provided in accordance with the invention a method for the separation of gaseous isotope compounds which comprises adiabatically expanding a gas stream of the gaseous isotope compounds and a supplemental gas which will form dimers with the gaseous isotope compounds at a low temperature in a range below 50° K., to cool the gas stream to a temperature in the range at which dimers are formed between isotope compounds and the supplemental gas, selectively exciting by electromagnetic radiation one isotope compound in the gas stream to effect selective dissociation of dimers of said one isotope compound, deflecting the flow of said gas stream containing said dissociated isotope compound and therefore lighter mass as compared to said non-dissociated dimers to effect a change of the isotope distribution in the gas stream caused by centrifugal forces resulting from said deflection with the dissociated isotope compounds tending to separate from the dimers in the gas stream to produce a gas stream portion enriched with said one isotope compound, and separating by peeling the enriched portion of the gas stream from the remainder depleted portion of the gas stream.

In accordance with the foregoing there is provided an apparatus for the separation of gaseous isotope compounds of $UF_6$ in which one isotope is U 235 and another isotope is U 238 comprising a slit-shaped nozzle with an opening for the entrance of a gas stream of isotope compounds of $UF_6$, a plurality of diffuser spaces arranged about the discharge of the nozzle with each said diffuser space defined by a slanting wall to deflect the flow of the gas stream impinging on the slanting wall and to effect a change of isotope distribution and consequently different enrichment in the gas stream caused by centrifugal forces resulting from said deflection, and a peeling device to separate the gas stream into gas streams of different enrichment, a housing surrounding said nozzle, diffuser spaces, slanting walls and peeler devices, separate collecting chambers in the housing for receiving the gas streams of different enrichment, outlets in the housing for the separate removal of the gas streams of different enrichment from the collecting chambers, axially arranged Brewster windows which pass laser radiation through the gas stream after discharge from the nozzle and before impinging on the slanting wall, and mirrors for reflecting the radiation back and forth disposed at the ends of the housing, an inlet in the housing and passageway to the nozzle for the introduction of the stream of gaseous isotope compounds to be separated, and canals leading to the outer parts of the nozzle for suctioning off boundary layers that may form in the outer parts of the nozzle.

Other features which are considered as characteristic for the invention are set forth in the appended claims.

Although the invention is illustrated and described herein as embodied in a method for the separation of gaseous isotope compounds, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
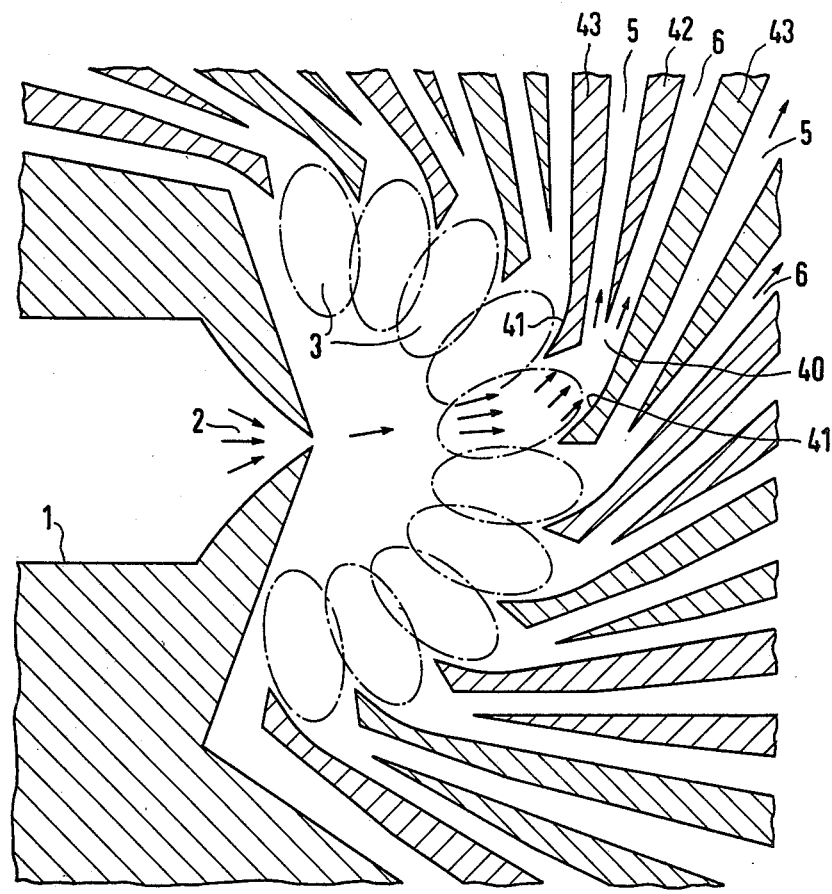
FIG. 1 is an enlarged diagrammatic illustration in cross section showing the relationship of the nozzle, diffuser and excitation zones in accordance with the invention, FIG. 2 diagrammatically illustrates a device in cross section for separating isotopes, in accordance with the invention, in which the individual parts such as slit nozzles, diffusers, deflection walls and peelers are shown.

According to the invention, in the range of the low temperatures reached after the adiabatic expansion, condensation occurs which, however, is inhibited for the one isotope compound by selective excitation. In the proximity of the end of the irradiation area a flow deflection is generated by the corresponding design of a diffuser such that a change of the isotope distribution in the gas stream is forced by the centrifugal forces caused in this process. A separation of the flow into enriched and depleted components, which are removed separately, is achieved by peeling devices. In another embodiment of the invention the expansion is controlled so that in the range of the low temperatures generated thereby, dimers between the uranium isotope molecules are formed. Then, the $UF_6$-dimers containing the isotope to be separated, for instance, uranium 235, are selectively dissociated by laser excitation. In the vicinity of the spatial end of the excitation region a flow deflection is produced by suitable design of a diffuser such that a different distribution of the dissociated and the not dissociated dimers is produced in the gas stream by the centrifugal forces brought about in the process and a corresponding separation of the stream is obtained by peeling devices. Besides dimers, other polymers can, of course, be formed, which can be dissociated in the manner mentioned. The term "dimers" is used in this sense throughout the entire application. A further modification of the method consists in that, using at least one supplemental gas, for instance xenon, to form, as is well known, dimers between the uranium isotope molecules and a supplemental gas. The dimers containing 235 $UF_6$ are then dissociated selectively by laser excitation. In the vicinity of the spatial end of the excitation region, a flow deflection is forced by suitable design of a diffuser such that a different distribution of the dissociated and the not dissociated dimers is generated in the gas stream by the centrifugal forces effected in the process, and a corresponding separation of the stream is achieved by peeling devices. The laser stands here generally for narrow-band electromagnetic radiation, which can also be generated by more conventional means such as klystrons. The term excitation is to also include polarization.

The following will aid in a better understanding of the invention. In a manner known per se, the $UF_6$-containing gas mixture is expanded to a large extent in a nozzle and the adjoining space to temperatures so low, for instance, to 50° K., that the resulting narrowing of the lines and bands permits selective excitation. The flow parameters and the shape of the nozzle are chosen so that in the range of low temperatures, rapid condensation of the $UF_6$ or attachment to at least one supplemental component takes place without irradiation. Through irradiation with a suitable wavelength, bandwidth and power density, the condensation of the 235 $UF_6$ in the low-temperature region of the gas jet is selectively prevented. Thus, condensation complexes are formed which contain 238 $UF_6$ and have relatively large mass, while the 235 $UF_6$ remains substantially molecular and thus has a relatively small mass. In the vicinity of the end of the irradiation area, a flow deflection is brought about by mechanical means, and through the temperature rise that takes place due to the compression (a strong compression shock occurs), further condensation is stopped. Because of the deflection and the centrifugal forces occurring, the heavier dimers or condensed particles collect on the outside of the lighter ones on the inside. The regions with heavy particles can then be separated from those with light ones in known manner by means of peeling devices. In the present case, the separation effect is considerably larger than in the known separating-nozzle method, since the mass difference is one- or several times the molecular mass, as compared to only about 1% in the isotope mass difference. By controlling the process in this manner, part of the expansion pressure drop is furthermore recovered due to the compression shock occurring in the diffusor; a so-called pressure recovery thus takes place.

Figure 2:
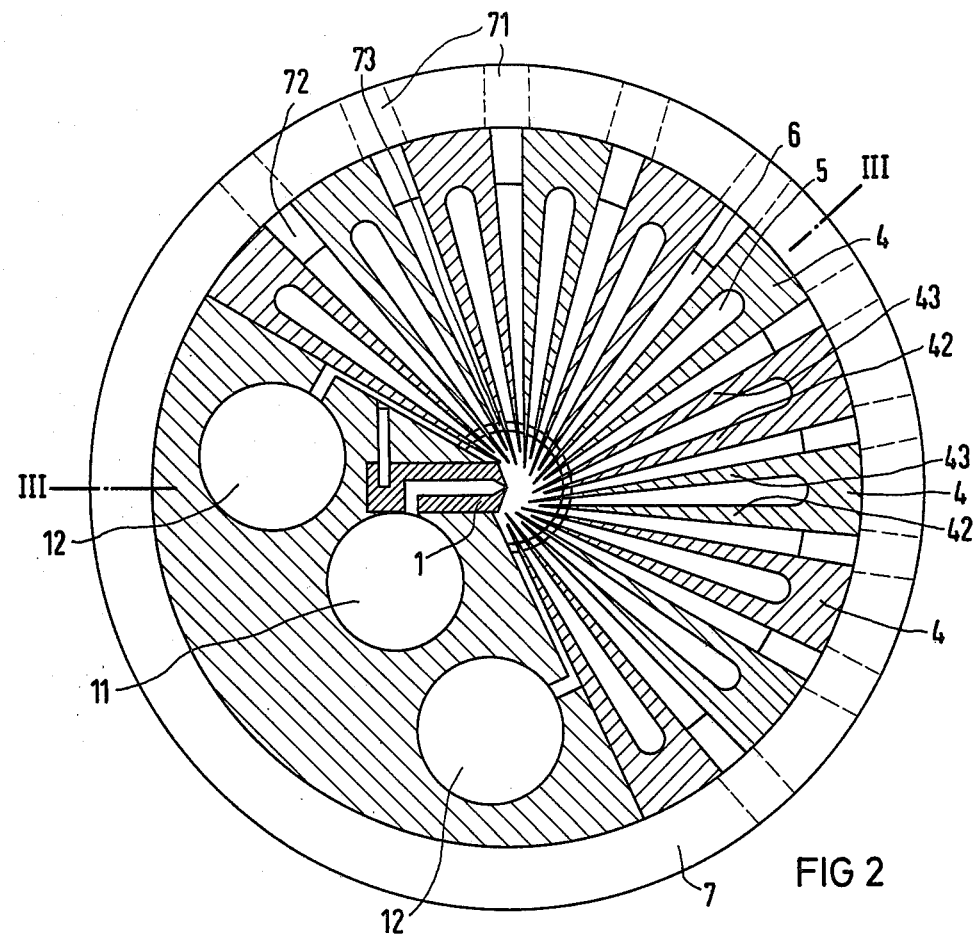
Figure 3:
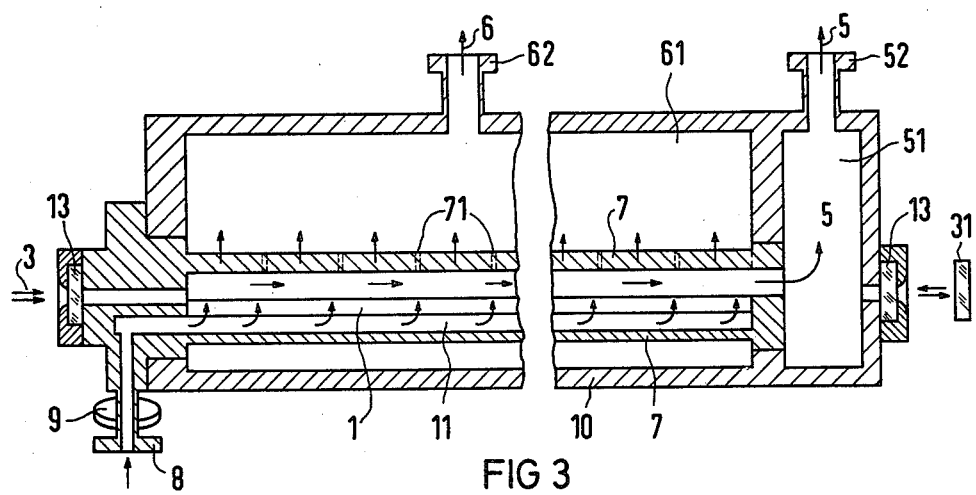
FIG. 3 is a longitudinal cross section of the separating device of FIG. 2 taken along line III—III of FIG. 2.

To explain this method in greater detail, reference is made to FIGS. 1 to 3, where sections and the overall arrangement of apparatus serving to carry out these methods are shown diagrammatically.

FIG. 1 shows a schematic cross section through the nozzle and the diffuser as well as the excitation zones, enlarged about 100-times. The expansion nozzle is designated by numeral 1 and the gas jet passing through it with 2. The gas jet leaving the nozzle spreads out radially and reaches the diffuser spaces 40 which are arranged radially about the nozzles. The zones of laser radiation are shown as zones 3 which are surrounded by dash-dotted lines and extend into these diffuser spaces. They are brought about by repeated reflection of the laser beam used. The flow pattern is indicated by flow arrows for one diffuser space 40. This flow is bounded by the walls 43, the surface being shaped at point 41 of this wall so that the flow is sharply deflected and the already mentioned centrifugal forces are generated in the process. A peeler 42 then separates the enriched substream 5 from the depleted substream 6. The parallel arrangement of individual separating devices shown here serves for increasing the throughput and therefore, the efficiency. Of course, one can have a simple arrangement with only one diffuser space 40.

The process that can be carried out with this apparatus then proceeds as follows:

The $UF_6$-containing gas mixture 2 enters the convergent slit nozzle 1, and is expanded there and in the adjoining expansion space in front of the nozzle until the desired temperature is reached. With the substantially radial flow which is given by the present nozzle shape, the loci of equal temperature are nearly cylindrical surfaces, except for the boundary layer at the nozzle. In the adjoining ring space, the gas stream is traversed by laser beams 3 of approximately elliptical cross section which overlap each other. The frequency and bandwidth of the laser beam correspond to the Q-branch of the 235 $UF_6$ band for heavy cooling. Its power density is chosen so high that the substantial part of the 235 $UF_6$-molecules remains monomolecular during the dwellng time in the irradiation zone, i.e., it is not condensed. This is the case if each 235 $UF_6$-molecule is excited about four times during this time. Through impact-induced transitions from $V_3$ to other fundamental vibrations and their occupable combinations, an occupancy whch remains very low of the ground level of the 235 $UF_6$-molecules can be achieved. This is necessary in order to prevent condensation of the 235 $UF_6$ or the attachment thereof to the other condensed molecules. It should also be pointed out that selective polarization (see German Published Non-Prosecuted Application No. 23 11 584) can also be used for this purpose instead of excitation through absorption. By deflecting the flow still in the region of the laser radiation, the already mentioned spatial separation of the heavier particles from the lighter ones is then effected.

FIG. 2 shows a cross section through such a separating device, which is constructed inside a tubular holding structure 7 and can be built-up from metal foils cut out by photo-etching by the well-known principle of stacking. For the sake of clarity, however, the individual parts are indicated here by different shading. The gas stream of the isotope mixture gets to the slit nozzle 1 via a canal 11 and arrives from there in the irradiation space which opens into the diffusers, as shown in FIG. 1. The diffusers are formed by elements 4 which are arranged radially. They are provided with a radial slot for removing the enriched flow component 5. The one wall is the diffusor wall 43 which deflects the flow; the other confining wall is the peeler 42. Between these elements 4, there remain spaces which serve for the radial removal of the depleted flow component 6, i.e., the component with the heavier particles. Canals 12 in this cross section are further provided for suctioning-off the boundary layers that may form in the outer parts of the nozzle.

As already mentioned, this apparatus can be constructed by means of the stacking technique, but the individual elements 4 can also be kept at the specified spacing by means of support rings 72 and 73, and the desired flow conditions ensured thereby.

A longitudinal cross section through this arrangement is shown in FIG. 3, which corresponds approximately to the line III—III of FIG. 2. The tubular mounting structure 7 is built into a housing 10 which contains a plenum 51 at the end face, into which the gas streams 5 flow, as well as a radial collecting chamber 61, into which the depleted flow components 6 are conducted via slots 71 in the mounting structure 7. These flow components are taken from the enrichment equipment via the connections 62 and 52. The isotope mixture is supplied through the connection 8. The connections 9 are in communication with the canals 12 for suctioning-off the boundary layer. The laser beam 3 enters the irradiation space via Brewster windows 13 and is reflected back and forth repeatedly via a mirror 31 and in this manner produces the irradiation zones shown in FIG. 1. Pump connections as well as supply sources etc. are not shown for the sake of clarity. The pressure recovery mentioned at the outset is adjusted, as is well known, by suitable choice of the back pressure, i.e., the pressure after the diffusers.

This method, which has been illustrated so far by the example of inhibiting condensation to generate particles of large mass difference, can also be carried out in modified form in accordance with a method for the separation of gaseous isotope compounds, especially of $UF_6$, by means of selective excitation of the one isotope compound by laser radiation after adiabatic expansion of the gas, characterized by the feature that in the range of the low temperatures generated thereby, dimers are formed between the uranium isotope molecules; that then, the $UF_6$-dimers containing the isotope to be separated, for instance, U 235, are dissociated selectively by excitation and that in the vicinity of the spatial end of the excitation zone a flow deflection is forced by suitable design of the diffusor such that a different distribution of the dissociated and not dissociated dimers in the gas stream is obtained by the centrifugal forces produced in this process; and that a corresponding separation of the stream is achieved by peeling devices.

Another modified form is a method for the separation of gaseous isotope compounds, especially of $UF_6$, by means of selective excitation of the one isotope compound by laser radiation after adiabatic expansion of the gas, characterized by the feature that in the range of the low temperatures generated thereby, dimers between the uranium isotope molecules and at least one supplemental gas, for instance, xenon, are formed; that then, the dimers containing 235 $UF_6$ are dissociated selectively by excitation and in the vicinity of the spatial end of the excitation zone, a flow deflection is forced by suitable design of a diffuser such that a different distribution of the dissociated and the not dissociated dimers in the gas stream is generated by the centrifugal forces produced in the process, and a corresponding separation of the flow is obtained by peeling device.

According to the first variant, a supplemental gas, such as helium, is chosen which, under the conditions set, does not attach itself, or not rapidly, to $UF_6$. Through the pressure and the nozzle shape, conditions can be adjusted in the irradiation space, under which $UF_6$-dimers form rapidly. These dimers consist of molecules of 235 $UF_6$ and 238 $UF_6$ bound to each other by van der Waals forces, as well as 235 $UF_6$/235 $UF_6$ and 238 $UF_6$/238 $UF_6$.

Since the uranium isotopes have a natural ratio of 1:140, a ratio of the dimers of 235 $UF_6$/238 $UF_6$ to the dimers 238 $UF_6$/238 $UF_6$ of 1:70 is obtained, neglecting the dimers 235 $UF_6$/235 $UF_6$.

The frequency of the radiation 3 is now chosen so that it corresponds to a vibration of the dimers 235 $UF_6$/238 $UF_6$, for instance to $V_3$ in the Q-branch. Under the action of this radiation, these dimers are dissociated, i.e., there is formed in the stream a monomolecular component of 235 $UF_6$ with a monomolecular component of 238 $UF_6$ of the same magnitude as well as remaining dimers of 238 $UF_6$/238 $UF_6$, which have at least twice the mass of the 235 $UF_6$-molecules. This then provides the prerequisite for the separation method described, which is based on mass inertia. It is also possible to choose instead of the irradiation frequency mentioned ($V_3$ in the Q-branch), a frequency which corresponds to the longer-wave vibration of the two molecules of the dimer relative to each other, whereby the dissociation likewise takes place. In that case, the wavelengths are in the order of 0.1 and 1 mm, so that the frequency-adjustable devices known for microwaves can be used instead of laser radiation. In comparison with most lasers, these also have considerably higher efficiency. In that case, the radiation space can be designed as a suitably slotted waveguide or resonator.

In the second variant, a supplemental gas such as xenon is chosen which attaches itself rapidly to the $UF_6$ under the chosen conditions in the irradiation region. The irradiation frequency must then correspond to one or several vibrations of the dimer of 235 $UF_6$/Xe.

The other dimers 238 $UF_6$/Xe remain unaffected by the radiation, so that at the diffuser entrance, there is again a mixture of light molecules 235 $UF_6$ and dimers 238 $UF_6$/Xe of substantially larger mass. Thus, separation by the principle of mass inertia is also possible with this setting of the operating conditions.

In conclusion, it should be mentioned that the invention, of artificially forming particles structured specific to the isotope of large mass difference can be applied not only for the separation of uranium isotopes but also correspondingly of isotopes of other elements.

There is claimed:

1. Method for the separation of gaseous isotope compounds in a mixture by selectively exciting by electromagnetic radiation one isotope compound, with the other isotope compounds in the mixture selectively non-excited, which comprises cooling a gas stream of gaseous isotope compounds together with an added gas by adiabatic expansion through a nozzle to form dimers containing said one isotope compound and said added gas by condensing said one gaseous isotope compound and said added gas, dissociating the dimers containing said one isotope compound by selectively exciting said one isotope compound by said electromagnetic radiation, thereby creating in said gas stream condensed particles containing the non-excited isotope compounds which are of large mass compared to said one isotope compounds, flowing the gas stream through a plurality of diffuser spaces arranged about the discharge of the nozzle, deflecting the flow of the gas stream to effect a change of isotope distribution and different enrichment in the gas stream caused by centrifugal forces, and separating the gas stream by a peeler in the diffuser space into gas streams of different enrichment.

2. Method according to claim 1, wherein the gaseous isotope compounds for separation are $235UF_6$ and $238UF_6$.

3. Method according to claim 2, wherein said nozzle is a slit-shaped nozzle, and wherein each said diffuser space about the slit-shaped nozzle has a wall disposed obliquely to the flow-direction of said gas stream to deflect the flow of the gas stream impingeing on the wall, and wherein said diffuser spaces are parted by said peelers to divide the gas stream into gas streams having a different 235 $UF_6$ concentration, an axially and radially arranged collecting chambers to receive the streams of different concentration, said chambers forming part of a housing, outlets in the housing for the separate removal of the gas streams of different concentration from the collecting chambers, axially arranged Brewster windows which pass laser radiation through the gas stream after discharge from the nozzle and before impingeing on the oblique walls, mirrors for reflecting the radiation back and forth, and canals leading to the outer parts of the nozzle for suctioning off boundary layers that may form in the outer part of the nozzle.

4. Method according to claim 3, wherein the slanting walls, peelers and diffuser spaces are built up within a tubular mounting structure from metal foils made by photo-etching by the well-known principle of stacking.

* * * * *